(12) United States Patent
Yamazaki et al.

(10) Patent No.: US 10,995,230 B2
(45) Date of Patent: May 4, 2021

(54) AQUEOUS PIGMENT INK FOR TEXTILE INKJET PRINTING, METHOD FOR PRODUCING PRINTED TEXTILE ITEM, AND INK SET

(71) Applicant: RISO KAGAKU CORPORATION, Tokyo (JP)

(72) Inventors: Takahisa Yamazaki, Ibaraki (JP); Akiko Hayashi, Ibaraki (JP); Shunsuke Uozumi, Ibaraki (JP); Kokoro Kinoe, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 206 days.

(21) Appl. No.: 16/105,497

(22) Filed: Aug. 20, 2018

(65) Prior Publication Data

US 2019/0352528 A1 Nov. 21, 2019

(30) Foreign Application Priority Data

May 18, 2018 (JP) ............................. JP2018-096023

(51) Int. Cl.

| | | |
|---|---|---|
| C09D 11/40 | (2014.01) | |
| C09D 11/38 | (2014.01) | |
| C09D 11/033 | (2014.01) | |
| B41M 5/00 | (2006.01) | |
| C09D 11/102 | (2014.01) | |
| B41J 3/407 | (2006.01) | |
| C09D 11/104 | (2014.01) | |

(52) U.S. Cl.
CPC ............. *C09D 11/40* (2013.01); *B41J 3/4078* (2013.01); *B41M 5/0023* (2013.01); *C09D 11/033* (2013.01); *C09D 11/102* (2013.01); *C09D 11/104* (2013.01); *C09D 11/38* (2013.01)

(58) Field of Classification Search
None
See application file for complete search history.

(56) References Cited

U.S. PATENT DOCUMENTS

| | | | | |
|---|---|---|---|---|
| 4,847,316 A * | 7/1989 | Schick | ................... | C08L 67/00 524/88 |
| 4,996,252 A * | 2/1991 | Phan | ....................... | C08L 67/00 524/88 |
| 5,162,399 A * | 11/1992 | Sharma | ................ | C09D 17/001 523/351 |
| 9,724,937 B2 | 8/2017 | Ohashi et al. | | |
| 9,951,468 B2 * | 4/2018 | Arai | ...................... | C09D 11/107 |
| 10,150,881 B2 * | 12/2018 | Yamazaki | .............. | C09D 11/40 |
| 2009/0098312 A1 * | 4/2009 | Goto | ..................... | B41J 2/17553 427/595 |
| 2009/0176070 A1 * | 7/2009 | Goto | ..................... | C09D 11/322 428/195.1 |
| 2010/0196601 A1 * | 8/2010 | Goto | ....................... | C09C 1/565 427/256 |
| 2010/0295891 A1 * | 11/2010 | Goto | ....................... | B41J 2/2107 347/21 |
| 2013/0053485 A1 * | 2/2013 | Misawa | ............... | C09D 11/324 524/104 |
| 2016/0319142 A1 * | 11/2016 | Arai | ...................... | C09D 11/107 |
| 2017/0314194 A1 * | 11/2017 | Arai | ...................... | B41J 3/4078 |
| 2018/0030301 A1 * | 2/2018 | Yamazaki | ............ | C09D 11/322 |
| 2018/0237987 A1 * | 8/2018 | Urano | .................... | C09D 11/38 |
| 2020/0002561 A1 * | 1/2020 | Hayashi | ................. | B41J 3/4078 |

FOREIGN PATENT DOCUMENTS

| | | |
|---|---|---|
| JP | 2010-150453 | 7/2010 |
| JP | 2013/221141 | 10/2013 |
| JP | 2014-148563 | 8/2014 |
| JP | 2015-160860 | 9/2015 |
| JP | 2015-193742 | 11/2015 |

OTHER PUBLICATIONS

English translation of JP 2015/160860, dated Sep. 2015; 34 pages.*
English translation of JP 2013/221141, dated Oct. 2013; 20 pages.*
English translation of JP 2015/193742, dated Nov. 2015; 26 pages.*
English translation of JP 2010/150453, dated Jul. 2010; 22 pages.*

* cited by examiner

*Primary Examiner* — Helene Klemanski
(74) *Attorney, Agent, or Firm* — Hamre, Schumann, Mueller & Larson, P.C.

(57) ABSTRACT

An aqueous pigment ink for textile inkjet printing is disclosed that contains a pigment, a first water-dispersible resin, a second water-dispersible resin and water, wherein the first water-dispersible resin is at least one resin selected from the group consisting of a water-dispersible urethane resin, a water-dispersible (meth)acrylic resin and a water-dispersible styrene/(meth)acrylic resin, the second water-dispersible resin is a water-dispersible polyester resin, the total amount of the first water-dispersible resin and the second water-dispersible resin is from 2 to 18% by mass relative to the total mass of the ink, and the mass ratio of the second water-dispersible resin relative to the first water-dispersible resin (second water-dispersible resin/first water-dispersible resin) is from 0.1 to 5.0. A method for producing a printed textile item and an ink set are also disclosed.

18 Claims, No Drawings

AQUEOUS PIGMENT INK FOR TEXTILE INKJET PRINTING, METHOD FOR PRODUCING PRINTED TEXTILE ITEM, AND INK SET

CROSS REFERENCE TO RELATED APPLICATIONS

This application is based upon and claims the benefit of priority from the prior Japanese Patent Application No. 2018-096023, filed on May 18, 2018, the entire contents of which are incorporated by reference herein.

BACKGROUND OF THE INVENTION

Field of the Invention

Embodiments of the present description relate to an aqueous pigment ink for textile inkjet printing, a method for producing a printed textile item, and an ink set.

Description of the Related Art

Among methods for printing images such as text, pictures or designs onto fabrics or the like such as woven fabrics, knitted fabrics and nonwoven fabrics, in addition to screen printing methods and roller textile printing methods, textile inkjet printing methods which enable image processing to be performed by computer and textile printing to be performed in a substantially plateless manner are recently attracting considerable attention.

In the case of fabrics used for clothing and the like, in general, the printed images require not only favorable color development, but also superior rubbing fastness.

Among pigment inks used for textile printing, in order to improve the rubbing fastness, resins such as urethane resins, acrylic resins and styrene/acrylic resins have been proposed for use as the resin contained in the ink (JP 2014-148563 A, JP 2015-160860 A, and JP 2015-193742 A). Further, other techniques that have been proposed for improving the rubbing fastness include a method of protecting the printed image by coating the image with a resin layer containing no colorant as an overcoat (JP 2010-150453 A and JP 2013-221141 A).

SUMMARY OF THE INVENTION

One embodiment of the present invention provides an aqueous pigment ink for textile inkjet printing which contains a pigment, a first water-dispersible resin, a second water-dispersible resin and water, wherein the first water-dispersible resin is at least one resin selected from the group consisting of a water-dispersible urethane resin, a water-dispersible (meth)acrylic resin and a water-dispersible styrene/(meth)acrylic resin, the second water-dispersible resin is a water-dispersible polyester resin, the total amount of the first water-dispersible resin and the second water-dispersible resin is from 2 to 18% by mass relative to the total mass of the ink, and the mass ratio of the second water-dispersible resin relative to the first water-dispersible resin (second water-dispersible resin/first water-dispersible resin) is from 0.1 to 5.0.

Another embodiment of the present invention provides a method for producing a printed textile item that includes performing inkjet printing to a fabric using the aqueous pigment ink for textile inkjet printing described above.

Yet another embodiment of the present invention provides an ink set that includes the aqueous pigment ink for textile inkjet printing described above, and a pretreatment agent containing a cationic substance.

DETAILED DESCRIPTION OF THE EMBODIMENTS

Embodiments of the present invention are described below in detail, but the present invention is in no way limited by these embodiments, and various modifications and alterations may of course be performed.

<Aqueous Pigment Ink for Textile Inkjet Printing>

The aqueous pigment ink for textile inkjet printing of an embodiment of the present invention is an aqueous pigment ink for textile inkjet printing containing a pigment, a first water-dispersible resin, a second water-dispersible resin and water, wherein the first water-dispersible resin is at least one resin selected from the group consisting of a water-dispersible urethane resin, a water-dispersible (meth)acrylic resin and a water-dispersible styrene/(meth)acrylic resin, the second water-dispersible resin is a water-dispersible polyester resin, the total amount of the first water-dispersible resin and the second water-dispersible resin is from 2 to 18% by mass relative to the total mass of the ink, and the mass ratio of the second water-dispersible resin relative to the first water-dispersible resin (second water-dispersible resin/first water-dispersible resin) is from 0.1 to 5.0.

With this aqueous pigment ink for textile inkjet printing, a printed textile item having excellent rubbing fastness may be produced.

In the following description, the "aqueous pigment ink for textile inkjet printing" is sometimes referred to as simply "the ink".

The ink preferably contains a first water-dispersible resin that is at least one resin selected from the group consisting of a water-dispersible urethane resin, a water-dispersible (meth)acrylic resin and a water-dispersible styrene/(meth)acrylic resin, and a second water-dispersible resin that is a water-dispersible polyester resin.

When a first water-dispersible resin that is at least one resin selected from the group consisting of a water-dispersible urethane resin, a water-dispersible (meth)acrylic resin and a water-dispersible styrene/(meth)acrylic resin, and a second water-dispersible resin that is a water-dispersible polyester resin are combined in the ink, the rubbing fastness of printed textile items may be improved. Although not constrained by any particular theory, the reasons for this are thought to include the following. When a fiber rubs against another fiber, the fiber may be exposed to stretching and bending forces. Urethane resins, (meth)acrylic resins and styrene/(meth)acrylic resins generally have flexibility, and are thought to be capable of imparting the ink coating film on the fiber with sufficient flexibility to withstand those stretching and bending forces. However, because those types of resins have flexibility, the frictional resistance of the surface tends to be large, and this can also be a cause of rubbing. Accordingly, it is thought that, by also using a polyester resin that may readily form a coating film of superior smoothness and comparatively low frictional resistance, an ink coating film having reduced frictional resistance while also exhibiting good flexibility may be formed, enabling satisfactory rubbing resistance to be obtained.

A water-dispersible resin is a resin that can be dispersed in particulate form without dissolving in the water, thus forming an oil-in-water (O/W) emulsion. During ink production, the water-dispersible resins may, for example, be added as oil-in-water emulsions.

For the first water-dispersible resin, the use of an anionic water-dispersible resin in which the particle surfaces are negatively charged and the resin carries a minus charge is preferable.

For the second water-dispersible resin, the use of an anionic water-dispersible resin in which the particle surfaces are negatively charged and the resin carries a minus charge is preferable.

The anionic water-dispersible resin may have an anionic functional group existing at the surfaces of the particles, as in the case of a self-emulsifying resin. The particles of the anionic water-dispersible resin may have been subjected to a surface treatment to adhere an anionic dispersant to the surfaces of the resin particles. Representative examples of the anionic functional groups include carboxyl groups, sulfo groups and hydroxyl groups, whereas examples of the anionic dispersant include anionic surfactants and the like. The surface charge of the resin particles can be evaluated by measuring the zeta potential.

The first water-dispersible resin and the second water-dispersible resin are described below in further detail.

The ink preferably contains at least one resin selected from the group consisting of a water-dispersible urethane resin, a water-dispersible (meth)acrylic resin and a water-dispersible styrene/(meth)acrylic resin as the first water-dispersible resin.

From the viewpoint of improving the rubbing fastness, the first water-dispersible resin is preferably a water-dispersible resin having a glass transition temperature (Tg) of 10° C. or lower. For example, the first water-dispersible resin preferably includes a water-dispersible resin having a glass transition temperature of 10° C. or lower. For example, in those cases where the ink contains two or more resins as the first water-dispersible resin, all of those two or more resins may have a glass transition temperature of 10° C. or lower, or a portion of the resins (for example, only one of the resins) may have a glass transition temperature of 10° C. or lower.

The glass transition temperature (Tg) is a numerical value measured by a differential scanning calorimetry (DSC) measurement.

Although not constrained by any particular theory, as mentioned above, it is thought that the flexibility that is imparted to the ink coating film by the first water-dispersible resin contributes to an improvement in the rubbing fastness, and when a resin having a glass transition temperature of 10° C. or lower is used as the first water-dispersible resin, the flexibility of the ink coating film can be more easily improved, making it easier to improve the rubbing fastness of the printed textile item.

The glass transition temperature of the first water-dispersible resin is preferably 10° C. or lower, more preferably 5° C. or lower, and even more preferably 0° C. or lower. The glass transition temperature of the first water-dispersible resin may be any temperature of −50° C. or higher, and is typically −40° C. or higher.

A water-dispersible urethane resin has a urethane skeleton. Examples of resins that may be used as the water-dispersible urethane resin include polyether urethane resins that contain ether linkages in the main chain in addition to the urethane linkages, polyester urethane resins that contain ester linkages in the main chain in addition to the urethane linkages, and polycarbonate urethane resins that contain carbonate linkages in the main chain in addition to the urethane linkages. Among these, polycarbonate urethane resins and polyester urethane resins can be used particularly favorably. A combination of a plurality of these types of water-dispersible urethane resins may also be used.

Preferable examples of water-dispersible urethane resin include anionic urethane resins having an anionic functional group such as carboxyl group, sulfo group or hydroxyl group.

Specific examples of the water-dispersible urethane resin include SUPERFLEX 300 (glass transition temperature: −42° C.), SUPERFLEX 420 (glass transition temperature: −10° C.), SUPERFLEX 460 (glass transition temperature: −21° C.), SUPERFLEX 460S (glass transition temperature: −28° C.), SUPERFLEX 470 (glass transition temperature: −31° C.), SUPERFLEX 500M (glass transition temperature: −39° C.), SUPERFLEX 740 (glass transition temperature: −34° C.), and SUPERFLEX 150HS (glass transition temperature: 32° C.), all manufactured by DKS Co. Ltd., DAOTAN TW 6490/35WA (glass transition temperature: 32° C.) manufactured by Daicel-Allnex Ltd., TAKELAC W-6061 (glass transition temperature: 25° C.) manufactured by Mitsui Chemicals, Inc., and UW-1701F (glass transition temperature: 5° C.) manufactured by Ube Industries, Ltd. These resins are all anionic resins having a urethane skeleton.

Among these resins, those having a glass transition temperature of 10° C. or lower are preferred.

A single water-dispersible urethane resin may be used alone, or a combination of two or more water-dispersible urethane resins may be used.

A water-dispersible (meth)acrylic resin contains at least a methacrylic unit derived from a methacrylic-based monomer and/or an acrylic unit derived from an acrylic-based monomer. The water-dispersible (meth)acrylic resin may also contain one or more other units, provided these other units do not include a styrene unit derived from a styrene-based monomer described below. Examples of the methacrylic-based monomer and acrylic-based monomer include (meth)acrylate esters such as methyl (meth)acrylate, and (meth)acrylic acid and the like. The term "(meth)acrylic" represents both "acrylic" and "methacrylic", and the term "(meth)acrylate" represents both "acrylate" and "methacrylate".

A water-dispersible styrene/(meth)acrylic resin contains at least a styrene unit derived from a styrene-based monomer, and a methacrylic unit derived from a methacrylic-based monomer and/or an acrylic unit derived from an acrylic-based monomer. Examples of the styrene-based monomer include styrene, alkyl-modified styrenes (such as α-methylstyrene), and halogenated styrenes (such as 2-chlorostyrene).

There are no particular limitations on either the water-dispersible (meth)acrylic resin or the water-dispersible styrene/(meth)acrylic resin, and commercially available resins may be used.

Examples of commercially available water-dispersible (meth)acrylic resins and water-dispersible styrene/(meth)acrylic resins include Mowinyl 6751D (glass transition temperature: −32° C.), Mowinyl 6960 (glass transition temperature: −32° C.), Mowinyl 6963 (glass transition temperature: −28° C.), Mowinyl 702 (glass transition temperature: −19° C.), Mowinyl 8020 (glass transition temperature: −22° C.), Mowinyl 966A (glass transition temperature: −29° C.), Mowinyl 6718 (glass transition temperature: 3° C.), Mowinyl 6750 (glass transition temperature: 0° C.) and Mowinyl 7720 (glass transition temperature: 4° C.), all manufactured by The Nippon Synthetic Chemical Industry Co., Ltd., Joncryl PDX-7341 (glass transition temperature: 15° C.) and Joncryl PDX-7370 (glass transition temperature: 12° C.), manufactured by BASF Corporation, and NeoCryl A-1094 (glass transition temperature: 21° C.) and NeoCryl BT-62 (glass transition temperature: 22° C.), manufactured by DSM Coating Resins D.V. Among these resins, those having a glass transition temperature of 10° C. or lower are preferred.

For both the water-dispersible styrene/(meth)acrylic resin and the (meth)acrylic resin, a single resin may be used alone, or a combination of two or more resins may be used.

The amount of the first water-dispersible resin in the ink, relative to the total mass of the ink, is preferably at least 0.4% by mass, more preferably at least 1% by mass, and for example, may be 2% by mass or greater. Further, the amount of the first water-dispersible resin in the ink, relative to the total mass of the ink, is preferably not more than 16% by mass, more preferably not more than 14% by mass, even more preferably not more than 12% by mass, and for example, may be 10% by mass or less.

The amount of the water-dispersible resin refers to the solid fraction equivalent amount (namely, the amount of only the resin). This definition also applies below.

The ink preferably contains a water-dispersible polyester resin as the second water-dispersible resin.

Although there are no particular limitations on the number average molecular weight of the water-dispersible polyester resin, the number average molecular weight thereof may be typically at least 7,000.

For the water-dispersible polyester resin, in order to more effectively reduce rubbing resistance at the surface of the ink coating film, a water-dispersible polyester resin having a number average molecular weight of at least 10,000 is preferred. It is thought that the reason for this preference is that when the number average molecular weight is at least 10,000, the size of the polyester resin particles that exist in a dispersed form within the dried ink coating film may be sufficiently large to enable a more effective reduction in the rubbing resistance. A water-dispersible polyester resin having a number average molecular weight of 12,000 or greater is even more preferred. The number average molecular weight of the water-dispersible polyester resin may be, for example, typically not more than 500,000, and may be, for example, 100,000 or less. For example, the second water-dispersible resin preferably contains a water-dispersible polyester resin having a number average molecular weight of at least 10,000. When the ink contains two or more resins as the second water-dispersible resin, all of the two or more resins may each have a number average molecular weight of at least 10,000, or a portion of the resins (for example, only one resin) may have a number average molecular weight of at least 10,000.

The number average molecular weight of the water-dispersible polyester resin is obtained as a polystyrene-equivalent value using gel permeation chromatography (GPC) analysis. More specifically, the number average molecular weight can be determined as a polystyrene-equivalent value using a liquid feed unit LC-10ADvp and a UV-Vis spectrophotometer SPD-6AV manufactured by Shimadzu Corporation, with the measurement performed using a detection wavelength of 254 nm and using tetrahydrofuran as the solvent.

Although not particularly limited, the glass transition temperature (Tg) of the water-dispersible polyester resin is, for example, preferably from −50° C. to 120° C. For example, the second water-dispersible resin preferably contains a water-dispersible polyester resin having a glass transition temperature of −50° C. to 120° C. For example, when the ink contains two or more water-dispersible polyester resins as the second water-dispersible resin, all of the two or more resins may each have a glass transition temperature of −50° C. to 120° C., or a portion of the resins (for example, only one resin) may have a glass transition temperature of −50° C. to 120° C.

The glass transition temperature of the water-dispersible polyester resin is preferably at least −50° C. and more preferably 0° C. or higher, and for example, may be 5° C. or higher, or even higher than 10° C. The glass transition temperature of the water-dispersible polyester resin is preferably not higher than 120° C., and is more preferably 85° C. or lower.

Examples of the water-dispersible polyester resin include ELITEL KT-0507 (number average molecular weight: 17,000), ELITEL KT-8701 (number average molecular weight: 13,000), ELITEL KT-8803 (number average molecular weight: 15,000), ELITEL KT-9204 (number average molecular weight: 17,000), ELITEL KT-9511 (number average molecular weight: 17,000), ELITEL KA-1449S (number average molecular weight: 7,000) and ELITEL KA-5071S (number average molecular weight: 8,500), all manufactured by Unitika Ltd., VYLONAL MD-1100 (number average molecular weight: 20,000), VYLONAL MD-1200 (number average molecular weight: 15,000), VYLONAL MD-1245 (number average molecular weight: 20,000), VYLONAL MD-1335 (number average molecular weight: 8,000), VYLONAL MD-1480 (number average molecular weight: 15,000), VYLONAL MD-1500 (number average molecular weight: 8,000), VYLONAL MD-1930 (number average molecular weight: 20,000), VYLONAL MD-1985 (number average molecular weight: 25,000) and VYLONAL MD-2000 (number average molecular weight: 18,000), all manufactured by Toyobo Co., Ltd., and among these, resins having a number average molecular weight of 10,000 or greater are preferred.

A single water-dispersible polyester resin may be used alone, or a combination of two or more water-dispersible polyester resins may be used.

The amount of the second water-dispersible resin in the ink, relative to the total mass of the ink, is preferably at least 0.2% by mass, more preferably at least 0.5% by mass, and for example, may be 1% by mass or greater. The amount of the second water-dispersible resin in the ink, relative to the total mass of the ink, is preferably not more than 15% by mass, more preferably not more than 13% by mass, and may be 10% by mass or less.

From the viewpoint of improving the rubbing resistance of the ink coating film, the total amount of the first water-dispersible resin and the second water-dispersible resin in the ink, relative to the total mass of the ink, is preferably at least 2% by mass, more preferably at least 3% by mass, and for example, may be 5% by mass or greater.

From the viewpoint of improving the discharge performance from an inkjet printer head, the total amount of the first water-dispersible resin and the second water-dispersible resin in the ink, relative to the total mass of the ink, is preferably not more than 18% by mass, and more preferably 16% by mass or less.

From the viewpoints of maintaining balance between the first water-dispersible resin and the second water-dispersible resin, and obtaining an ink coating film with improved rubbing resistance, the mass ratio of the second water-dispersible resin relative to the first water-dispersible resin (second water-dispersible resin/first water-dispersible resin) is preferably not more than 5.0, more preferably not more than 4.5, and even more preferably 4.2 or less.

From the viewpoints of maintaining balance between the first water-dispersible resin and the second water-dispersible resin, and obtaining an ink coating film with improved rubbing resistance, the mass ratio of the second water-dispersible resin relative to the first water-dispersible resin (second water-dispersible resin/first water-dispersible resin) is preferably at least 0.1, and is more preferably 0.2 or greater.

The ink preferably contains a pigment. Any of the pigments typically used in this technical field may be used as the pigment.

Examples of non-white pigments include organic pigments such as azo-based pigments, phthalocyanine-based pigments, dye-based pigments, condensed polycyclic pigments, nitro-based pigments and nitroso-based pigments (with specific examples including brilliant carmine 6B, lake red C, Watchung red, disazo yellow, Hansa yellow, phthalocyanine blue, phthalocyanine green, alkali blue and aniline black), inorganic pigments including metals such as cobalt, iron, chromium, copper, zinc, lead, titanium, vanadium, manganese and nickel, as well as metal oxides and sulfides, and yellow ocher, ultramarine and iron blue pigments, and carbon blacks such as furnace carbon black, lamp black, acetylene black and channel black. The average particle diameter of the pigment is preferably at least 50 nm from the viewpoint of the color development properties, but is preferably not more than 500 nm from the viewpoint of discharge stability. For example, the average particle diameter of the pigment is preferably from 50 to 500 nm, and more preferably from 50 to 200 nm.

Examples of white pigments include inorganic pigments such as titanium oxide, zinc oxide, zinc sulfide, antimony oxide and zirconium oxide. Besides inorganic pigments, hollow resin microparticles and polymer microparticles may also be used. Of these pigments, from the viewpoint of the opacity, the use of titanium oxide is preferred. The average particle diameter of the titanium oxide is preferably at least 50 nm from the viewpoint of opacity, but is preferably not more than 500 nm from the viewpoint of discharge stability. In those cases where titanium oxide is used, titanium oxide that has undergone a surface treatment with alumina or silica is preferably used in order to inhibit any photocatalytic action. The amount of this surface treatment preferably represents about 5 to 20% by mass of the pigment.

Any one of these pigments may be used alone, or a combination of two or more different pigments may be used.

The amount added of the pigment varies depending on the type of pigment used, but from the viewpoint of color development and the like, the ink preferably contains about 0.1 to 30% by mass, and more preferably 0.1 to 15% by mass, of the pigment relative to the total mass of the ink.

A pigment dispersant, typical examples thereof including polymeric dispersants and surfactant-type dispersants, is preferably used to ensure stable dispersion of the pigment in the ink.

Examples of commercially available polymeric dispersants include the TEGO Dispers series manufactured by Evonik Industries AG (including TEGO Dispers 740W, TEGO Dispers 750W, TEGO Dispers 755W, TEGO Dispers 757W and TEGO Dispers 760), the Solsperse series manufactured by The Lubrizol Corporation (including Solsperse 20000, Solsperse 27000, Solsperse 41000, Solsperse 41090, Solsperse 43000, Solsperse 44000 and Solsperse 46000), the Joncryl series manufactured by Johnson Polymer, Inc. (including Joncryl 57, Joncryl 60, Joncryl 62, Joncryl 63, Joncryl 71 and Joncryl 501), as well as DISPERBYK-102, DISPERBYK-185, DISPERBYK-190, DISPERBYK-193 and DISPERBYK-199 manufactured by BYK Additives & Instruments GmbH, and Polyvinylpyrrolidone K-30 and Polyvinylpyrrolidone K-90 manufactured by DKS Co. Ltd.

Examples of the surfactant-type dispersants include anionic surfactants such as the DEMOL series manufactured by Kao Corporation (including DEMOL EP, DEMOL N, DEMOL RN, DEMOL NL, DEMOL RNL and DEMOL T-45), and nonionic surfactants such as the EMULGEN series manufactured by Kao Corporation (including EMULGEN A-60, EMULGEN A-90, EMULGEN A-500, EMULGEN B-40, EMULGEN L-40 and EMULGEN 420).

One kind of these pigment dispersants may be used singly, or two or more of these pigment dispersants may be used in combinations.

When a pigment dispersant is used, there are no particular limitations on the amount of the pigment dispersant added to the ink, which varies depending on the type of dispersant used, but generally, the amount of the active component (solid fraction) of the pigment dispersant, reported as a mass ratio relative to a value of 1 for the pigment, is preferably within a range from 0.005 to 0.5.

Self-dispersing pigments in which the pigment surface has been modified with hydrophilic functional groups may be used. Examples of commercially available self-dispersing pigments include FUJI SP BLACK 8154 manufactured by Fuji Pigment Co., Ltd., the CAB-O-JET series manufactured by Cabot Corporation (including CAB-O-JET 200, CAB-O-JET 300, CAB-O-JET 250C, CAB-O-JET 260M and CAB-O-JET 270), and the products BONJET BLACK CW-1S, CW-2 and CW-3 manufactured by Orient Chemical Industries, Ltd.

Microencapsulated pigments in which the pigment is coated with a resin may be used.

The ink preferably contains mainly water as the aqueous solvent. There are no particular limitations on this water, but water containing minimal ionic components is preferred. In particular, from the viewpoint of the ink storage stability, the amount of polyvalent metal ions such as calcium ions is preferably kept low. Examples of the water include ion-exchanged water, distilled water and ultra-pure water.

From the viewpoint of viscosity regulation, the amount of water in the ink is preferably from 20% by mass to 80% by mass, and more preferably from 30% by mass to 70% by mass, relative to the total mass of the ink.

The ink preferably contains a water-soluble organic solvent.

From the viewpoints of viscosity regulation and moisture retention, a water-soluble organic solvent that is liquid at room temperature and miscible with water is preferred as the water-soluble organic solvent. Examples of water-soluble organic solvents that may be used include lower alcohols such as methanol, ethanol, 1-propanol, isopropanol, 1-butanol, 2-butanol, isobutanol, 1,3-propanediol, 1,3-butanediol, 1,2-butanediol, 1,2-pentanediol, 1,2-hexanediol and 2-methyl-2-propanol; glycols such as ethylene glycol, diethylene glycol, triethylene glycol, tetraethylene glycol, pentaethylene glycol, propylene glycol, dipropylene glycol and tripropylene glycol; glycerol; acetins (monoacetin, diacetin and triacetin); glycol derivatives such as diethylene glycol monomethyl ether, diethylene glycol monobutyl ether, diethylene glycol dimethyl ether, diethylene glycol monoethyl ether acetate, triethylene glycol monomethyl ether, triethylene glycol monoethyl ether, triethylene glycol monopropyl ether, triethylene glycol monobutyl ether, tripropylene glycol monobutyl ether, triethylene glycol monohexyl ether, tetraethylene glycol monomethyl ether, tetraethylene glycol monoethyl ether, tetraethylene glycol monobutyl ether, tetraethylene glycol dimethyl ether and tetraethylene glycol diethyl ether; as well as triethanolamine, 1-methyl-2-pyrrolidone, β-thiodiglycol and sulfolane. Examples of water-soluble organic solvents that may be used further include low-molecular weight polyalkylene glycols, specific examples of which include polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700.

One of these water-soluble organic solvents may be used alone, or a combination of two or more different solvents may be used.

From the viewpoints of viscosity regulation and moisture retention, the amount of the water-soluble solvent in the ink is preferably from 1 to 80% by mass, and more preferably from 1 to 60% by mass, and for example, may be from 1 to 50% by mass, or from 5 to 40% by mass, relative to the total mass of the ink.

The ink may contain a basic substance.

In those cases where the first water-dispersible resin and/or the second water-dispersible resin are anionic, the ink preferably contains a basic substance. By adding a basic substance to the ink, the storage stability of the ink may be enhanced, and excellent rubbing fastness and superior color development may be more easily achieved, even when an ink that has been stored for a long period following production is used for printing.

The reason for this is thought to be as follows. When an ink is stored for a long period, an increase in the hydrogen ion concentration in the ink may be caused due to, for example, absorption of carbon dioxide and the release of acid from the pigment. If hydrogen ions adsorb to the anionic functional group sites of the water-dispersible resins, then the electrostatic repulsion tends to deteriorate and precipitation may be caused. In a case in which a basic substance is added to the ink, the hydrogen ions may be captured, and precipitation may be suppressed, meaning the rubbing fastness and color development properties may be maintained.

Examples of the basic substance include hydroxides of alkali metals and alkaline earth metals, and amines. Specific examples of the hydroxides of alkali metals and alkaline earth metals include lithium hydroxide, sodium hydroxide, potassium hydroxide, calcium hydroxide and magnesium hydroxide. Specific examples of the amines include ethanolamines such as monoethanolamine, diethanolamine and triethanolamine, ammonia water (ammonium hydroxide), and quaternary ammonium salts. Among these, sodium hydroxide or an ethanolamine may be used more favorably.

One of these basic substances may be used alone, or a combination of two or more substances may be used.

From the viewpoints of enhancing the storage stability and achieving superior rubbing fastness and color development after storage over time, the amount added of the basic substance, relative to the total mass of the ink, is preferably at least 0.01% by mass, and more preferably 0.2% by mass or greater. For example, in the case of a hydroxide, the amount of the hydroxide is preferably at least 0.01% by mass relative to the total mass of the ink, whereas in the case of an amine, the amount of the amine is preferably at least 0.1% by mass, and more preferably at least 0.2% by mass, relative to the total mass of the ink. From the viewpoints of enhancing the long term storage stability and achieving superior rubbing fastness and color development after storage, the amount added of the basic substance, relative to the total mass of the ink, is preferably not more than 5.0% by mass, and more preferably 2.0% by mass or less.

The ink may also contain one or more other components as appropriate. Examples of these other components include dispersing auxiliary agents, surface tension adjusters (surfactants), antioxidants, preservatives and crosslinking agents. If necessary, the ink may contain another water dispersible resin, in addition to the first water-dispersible resin and the second water-dispersible resin.

Here, the term "dispersing auxiliary agents" describes dispersants that are added to pigment dispersions that have already been dispersed, and typical dispersants may be used as these dispersing auxiliary agents. Examples of commercially available products that may be used include the products mentioned above as examples of pigment dispersants.

Examples of surface tension adjusters that may be used include anionic surfactants, cationic surfactants, amphoteric surfactants or nonionic surfactants, as well as polymer-based, silicone-based or fluorine-based surfactants.

In a case where one or more of these surfactants are added to the ink, it is possible to facilitate stable discharge of the ink drops by an inkjet method, and also to makes it easier to appropriately control the penetration of the ink, and is consequently preferred. The amount added of the surfactant (the total amount of surfactants in those cases when a surfactant is also used as a pigment dispersant) varies depending on the type of surfactant used, but from the viewpoints of the ink surface tension and the rate of ink penetration into substrates such as fabrics, the amount is preferably within a range from 0.1 to 10% by mass of the ink.

Specific examples of anionic surfactants include the EMAL series (including EMAL 0, EMAL 10, EMAL 2F, EMAL 40 and EMAL 20C), the NEOPELEX series (including NEOPELEX GS, NEOPELEX G-15, NEOPELEX G-25 and NEOPELEX G-65), the PELEX series (including PELEX OT-P, PELEX TR, PELEX CS, PELEX TA, PELEX SS-L and PELEX SS-H), and the DEMOL series (including DEMOL N, DEMOL NL, DEMOL RN and DEMOL MS), all manufactured by Kao Corporation.

Examples of cationic surfactants include the ACETAMIN series (including ACETAMIN 24 and ACETAMIN 86), the QUARTAMIN series (including QUARTAMIN 24P, QUARTAMIN 86P, QUARTAMIN 60W and QUARTAMIN 86W), and the SANISOL series (including SANISOL C and SANISOL B-50), all manufactured by Kao Corporation.

Examples of nonionic surfactants include acetylene glycol-based surfactants, such as the Surfynol series manufactured by Air Products and Chemicals, Inc. (including Surfynol 104E, Surfynol 104H, Surfynol 420, Surfynol 440, Surfynol 465 and Surfynol 485) and OLFINE E1004, OLFINE E1010 and OLFINE E1020 manufactured by Nissin Chemical Industry Co., Ltd., and polyoxyethylene alkyl ether-based surfactants, such as the EMULGEN series manufactured by Kao Corporation (including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

Examples of amphoteric surfactants include the AMPHITOL series manufactured by Kao Corporation (including AMPHITOL 20BS, AMPHITOL 24B, AMPHITOL 86B, AMPHITOL 20YB and AMPHITOL 20N).

From the viewpoints of the ink storage stability and achieving favorable rubbing fastness and color development properties after storage, the pH of the ink is preferably at least 7.0, and more preferably 7.5 or higher. From the viewpoints of the ink storage stability and achieving favorable rubbing fastness and color development properties after storage, the pH of the ink is preferably less than 10.0, and more preferably less than 9.0.

The viscosity of the ink may be adjusted as appropriate, but for example, from the viewpoint of the discharge properties, the viscosity at 23° C. is preferably from 1 to 30 mPa·s.

There are no particular limitations on the method used for producing the ink, and production may be performed using appropriate conventional methods.

For example, the ink may be produced by using a conventional stirring device such as a three-one motor to disperse all of the components, either in a single batch or in a number of separate batches, and then, if desired, passing the resulting dispersion through a conventional filtration device such as a membrane filter.

The aqueous pigment ink for textile inkjet printing according to the present embodiment can be used favorably for printing to fabrics.

There are no particular limitations on the fabric, and for example, fabrics containing any of various natural or synthetic fibers such as cotton, silk, wool, linen, nylon, polyester, rayon, acetate or cupra may be used. Examples of the fabric include woven fabrics, knitted fabrics and non-woven fabrics.

Polyester fibers, which in recent years have shown a significant increase in consumption, tend to have fewer polar groups than natural fibers such as cotton, and therefore fixing pigment inks to the polyester fibers tends to be more difficult, meaning ensuring favorable rubbing fastness for fabrics containing polyester fibers tends to be problematic.

However, the ink of the present embodiment may be used favorably even on fabrics containing polyester fibers, and even when used on a fabric containing polyester fibers, a printed textile item having excellent rubbing fastness may be produced. The fabric containing polyester fibers may be a fabric containing at least 30% by mass, at least 50% by mass or at least 75% by mass of polyester fibers, or may be a fabric composed 100% by mass of polyester fibers.

In order to reduce or prevent bleeding of the ink and improve the color development properties, it is preferable that, prior to printing of the ink containing the pigment, a pretreatment agent containing a cationic substance such as a polyvalent metal salt or a cationic polymer that has an effect of causing aggregation of the pigment is applied to the fabric in advance.

However, when the fabric is subjected to a pretreatment using a pretreatment agent containing a cationic substance, the rubbing fastness of the obtained printed textile item may sometimes deteriorate. Although not constrained by any particular theory, it is thought that this is because when the pigment undergoes aggregation and fixation to the fiber surfaces as a result of use of the pretreatment agent, and the fibers then rub against one another, the pigment aggregates fixed to the fiber surfaces tend to act as starting points for ink flaking. The ink of the present embodiment can be used favorably even on fabrics to which a pretreatment agent containing a cationic substance has been applied, and in a case in which the ink is used in combination with a pretreatment agent containing a cationic substance, a printed textile item having excellent color development and rubbing fastness may be produced.

<Method for Producing Printed Textile Item>

The method for producing a printed textile item according to an embodiment of the present invention is a method for producing a printed textile item that includes performing inkjet printing to a fabric using the aqueous pigment ink for textile inkjet printing described above (hereafter sometimes referred to as "the inkjet printing step").

Examples of fabrics that may be used include the fabrics described above for use with the aqueous pigment ink for textile inkjet printing.

According to this method for producing a printed textile item, a printed textile item having excellent rubbing fastness may be produced.

In one embodiment, a fabric containing polyester fibers can be used favorably as the fabric, and even when a fabric containing polyesters fibers is used, a printed textile item having superior rubbing fastness may be produced. The fabric containing polyester fibers may, for example, be a fabric containing at least 30% by mass, at least 50% by mass or at least 75% by mass of polyester fibers, or may be a fabric composed 100% by mass of polyester fibers.

The inkjet printer used in the inkjet printing step may employ any of various systems, including a piezo system, electrostatic system or thermal system, and for example, liquid droplets of the ink may be discharged from the inkjet head based on a digital signal, with the discharged ink droplets being adhered to the substrate.

Although there are no particular limitations on the amount of the ink applied to the fabric, from the viewpoint of texture, the amount applied per unit area of the fabric is preferably not more than 500 $g/m^2$, more preferably not more than 100 $g/m^2$, and even more preferably 50 $g/m^2$ or less.

The method for producing a printed textile item may include, prior to the inkjet printing step, applying a pretreatment agent containing a cationic substance to the fabric (hereafter sometimes referred to as "the pretreatment step").

By applying a pretreatment agent containing a cationic substance to the fabric prior to the inkjet printing step, the color development properties of the printed textile item may be improved.

Further, as mentioned above, when the fabric is subjected to a pretreatment using a pretreatment agent containing a cationic substance, the rubbing fastness of the obtained printed textile item may sometimes deteriorate, but in the method for producing a printed textile item of this embodiment that uses the aqueous pigment ink for textile inkjet printing described above, the rubbing fastness of the printed textile item may be more easily maintained even when a pretreatment agent containing a cationic substance is applied in advance to the fabric.

In one embodiment, it is preferable that a fabric containing polyester fibers is used as the fabric, and that the pretreatment step of applying a pretreatment agent containing a cationic substance is performed prior to the inkjet printing step.

Because polyester fibers have excellent strength, a cloth fabric or clothing can be formed using a small amount of fibers, and therefore fabrics that use polyester fibers generally exhibit excellent lightweight properties, and have low moisture absorption and excellent drying properties. However, as a result, when inkjet textile printing is performed, bleeding tends to occur more easily, and the color development properties sometimes deteriorate. Accordingly, when a fabric containing polyester fibers is used, from the viewpoint of the color development properties, a pretreatment agent containing a cationic substance is preferably applied in advance to the fabric.

The pretreatment agent preferably contains a cationic substance. Examples of the cationic substance include polyvalent metal salts and cationic polymers.

The polyvalent metal salt is composed of a divalent or higher polyvalent metal ion and an anion. Examples of the divalent metal ion include $Ca^{2+}$, $Mg^{2+}$, $Cu^{2+}$, $Ni^{2+}$, $Zn^{2+}$ and $Ba^{2+}$. Examples of the anion include $Cl^-$, $NO_3^-$, $CH_3COO^-$, $I^-$, $Br^-$ and $ClO_3^-$. Specific examples of the salt include calcium chloride, calcium nitrate, magnesium nitrate, copper nitrate, calcium acetate and magnesium acetate.

One of these metal salts may be used alone, or a mixture of a plurality of kinds of salts may be used.

The concentration of the polyvalent metal salt in the pretreatment agent, relative to the total mass of the pretreatment agent, is preferably at least 0.5% by mass, more preferably at least 1% by mass, and for example may be 5% by mass or greater. The concentration of the polyvalent metal salt in the pretreatment agent, relative to the total mass of the pretreatment agent, is preferably not more than 30% by mass, more preferably not more than 25% by mass, and for example may be not more than 20% by mass or 15% by mass or less.

Examples of the cationic polymers include polyvinyl amines, polyallylsulfones and salts thereof, polyallylamines and salts thereof, and acrylamide copolymers. Examples of commercially available cationic polymers include SHALLOL DC-902P (polydiallyldimethylammonium chloride) and the like manufactured by DKS Co. Ltd.

Examples of the cationic polymers also include cationic water-dispersible resins. Cationic water-dispersible resins are composed of positively charged resin particles in which the surfaces of the resin particles carry a plus charge, and these particles can be dispersed in particulate form, without dissolution in water, to form an oil-in-water (O/W) emulsion. The cationic water-dispersible resin may have a cationic functional group existing at the surfaces of the particles, in the same manner as a self-emulsifying resin. The particles of cationic water-dispersible resin may have been subjected to a surface treatment to adhere a cationic dispersant to the surfaces of the resin particles. Representative examples of the cationic functional groups include primary, secondary and tertiary amino groups, or a pyridine group, imidazole group, benzimidazole group, triazole group, benzotriazole group, pyrazole group or benzopyrazole group, whereas examples of the cationic dispersant include primary, secondary, tertiary and quaternary amino group-containing acrylic polymers, polyethyleneimines, cationic polyvinyl alcohol resins, and cationic water-soluble multibranched polyesteramide resins. Examples of resins that can be used as the cationic water-dispersible resin include resins, examples thereof including ethylene/vinyl chloride copolymer resins, (meth)acrylic resins, styrene/maleic anhydride copolymer resins, urethane resins, vinyl acetate/(meth)acrylic copolymer resins, and vinyl acetate/ethylene copolymer resins, and resin emulsions of these resins, into which a cationic functional group has been introduced, or which have undergone surface treatment with a cationic dispersant or the like, in order to impart a positive surface charge to the resin.

The amount of surface charge on the resin particles can be evaluated using a particle charge meter. By measuring the amount of anions or the amount of cations required to neutralize a sample of the resin, the amount of surface charge can be calculated. Examples of particle charge meters that can be used include the colloidal particle charge meter Model CAS manufactured by Nihon Rufuto Co., Ltd.

The amount of the cationic polymer in the pretreatment agent, relative to the total mass of the pretreatment agent, is preferably at least 0.5% by mass, and more preferably 1% by mass or greater. The amount of the cationic polymer in the pretreatment agent, relative to the total mass of the pretreatment agent, is preferably not more than 50% by mass, and more preferably 30% by mass or less.

The pretreatment agent preferably contains mainly water as the aqueous solvent. There are no particular limitations on this water, and examples include ion-exchanged water, distilled water and ultra-pure water.

The amount of water in the pretreatment agent, relative to the total mass of the pretreatment agent, is preferably at least 60% by mass, and more preferably 65% by mass or greater. The amount of water in the pretreatment agent may, for example, be not more than 95% by mass, and is typically 90% by mass or less.

The pretreatment agent preferably contains a surfactant. Either one, or two or more, of the surfactants that may be used in the ink may be selected and used in the pretreatment agent.

The amount of the surfactant in the pretreatment agent, relative to the total mass of the pretreatment agent, is preferably at least 0.1% by mass, more preferably at least 0.3% by mass, and even more preferably 0.5% by mass or greater. The amount of the surfactant in the pretreatment agent, relative to the total mass of the pretreatment agent, is preferably not more than 30% by mass, more preferably not more than 20% by mass, and even more preferably 10% by mass or less.

A water-dispersible resin other than the cationic substance may be added to the pretreatment agent for the purposes of improving the fastness and suppressing fluffing at the printed surface of the fabric or the like. Examples of this type of water-dispersible resin include urethane resins, (meth) acrylic resins and styrene/(meth)acrylic resins, and either one, or two or more, of the resins that may be used in the ink may be selected and used in the pretreatment agent.

The amount of this type of water-dispersible resin in the pretreatment agent, relative to the total mass of the pretreatment agent, is preferably at least 0.5% by mass, and more preferably 1% by mass or greater. The amount of the water-dispersible resin in the pretreatment agent, relative to the total mass of the pretreatment agent, is preferably not more than 30% by mass, more preferably not more than 20% by mass, and may be 15% by mass or less.

If required, the pretreatment agent may also contain one or more other components such as water-soluble organic solvents, antifoaming agents, pH adjusters, antioxidants and preservatives.

The pretreatment agent is preferably applied to at least the region of the fabric to which ink is to be printed in the inkjet printing step (hereafter also referred to as "the print region"), and may be applied to the entire surface of the fabric including the print region.

Application of the pretreatment agent in the pretreatment step may be performed by using a brush, roller, bar coater, or air brush or the like to uniformly coat the surface of the fabric, or a printing technique such as inkjet printing or gravure printing may be used to print an image using the pretreatment agent. The amount of the pretreatment agent applied to the fabric is typically from 30 to 200 $g/m^2$, and may be from 80 to 150 $g/m^2$. The amount of the pretreatment agent applied to the fabric, relative to the total mass of the fabric, may be from 10 to 120% by mass, or from 20 to 100% by mass.

The method for producing a printed textile item may include heating of the fabric (hereafter sometimes referred to as a "heat treatment step").

For example, following the inkjet printing step, a heat treatment step of heating the fabric is preferably performed. This may dry the ink and causes the water-dispersible resins to undergo film formation, making it easier to form a strong ink film.

A heat treatment step of heating the fabric may be performed after the pretreatment step.

There are no particular limitations on the heating conditions used during the heat treatment step, but for example, the heating temperature may be set to about 100 to 180° C.

The method for producing a printed textile item may also include one or more other steps such as other treatment steps.

<Ink Set>

The ink set of an embodiment of the present invention contains the aqueous pigment ink for textile inkjet printing described above, and a pretreatment agent containing a cationic substance. According to this ink set, a printed textile item having excellent rubbing fastness may be produced.

The aqueous pigment ink for textile inkjet printing is as described above. As the pretreatment agent containing a cationic substance, the pretreatment agent containing a cationic substance that can be used in the method for producing a printed textile item described above may be used. The ink set may, for example, contain one or more other inks and/or one or more other treatment agents.

EXAMPLES

The present invention is described below in further detail based on a series of examples, but the present invention is not limited to only these examples. Unless specifically stated otherwise, "%" represents "% by mass". The blend amounts shown for the various components in the tables also indicate "% by mass" values.

<Test Pieces>

A 100% polyester Oxford fabric that had been cut to dimensions of 210 mm×74 mm was used as test pieces.

<Preparation of Pretreatment Agents>

The materials shown in Table 1 were mixed in the blend ratios shown in Table 1 to prepare pretreatment agents.

TABLE 1

|  | Material | Non-volatile fraction concentration | Pretreatment agent A | Pretreatment agent B |
|---|---|---|---|---|
| Cationic polymer | SHALLOL DC-902P | 51.0% | 10.0 |  |
| Water-dispersible resin | SUPERFLEX 420 | 32.0% |  | 20.0 |
| Polyvalent metal salt | Calcium chloride |  |  | 10.0 |
| Surfactant | Surfynol 465 | 100.0% | 3.0 | 3.0 |
| Water | Ion-exchanged water |  | 87.0 | 67.0 |
| Total (% by mass) |  |  | 100.0 | 100.0 |

The materials shown in Table 1 were as follows.

SHALLOL DC-902P: polydiallyldimethylammonium chloride (a cationic polymer), manufactured by DKS Co. Ltd.

SUPERFLEX 420: a water-dispersible urethane resin, manufactured by DKS Co. Ltd.

Calcium chloride: manufactured by Tomita Pharmaceutical Co., Ltd.

Surfynol 465: an acetylene glycol-based surfactant (a nonionic surfactant), manufactured by Air Products and Chemicals, Inc.

<Preparation of Inks>

The materials shown in Tables 2 and 3 were mixed in the blend ratios shown in Tables 2 and 3, and following mixing, each mixture was filtered through a 0.8 μm cellulose acetate membrane filter to remove coarse particles, thus obtaining inks of a series of examples and comparative examples.

In Tables 2 and 3 shown below, the "molecular weight" shown for the second water-dispersible resin represents the number average molecular weight obtained as a polystyrene-equivalent value using a GPC method.

TABLE 2

| | Raw material | Molecular weight | Tg [°C.] | Pigment solid fraction [%] | Resin solid fraction [%] | Ink 1 | Ink 2 | Ink 3 | Ink 4 | Ink 5 | Ink 6 | Ink 7 | Ink 8 | Ink 9 | Ink 10 | Ink 11 | Ink 23 |
|---|---|---|---|---|---|---|---|---|---|---|---|---|---|---|---|---|---|
| Pigment | FUJI SP BLACK 8154 | | | 19% | | 7.9 | 7.9 | 7.9 | 7.9 | 7.9 | 7.9 | 7.9 | 7.9 | 7.9 | 7.9 | | 7.9 |
| | CAB-O-JET250C | | | 10% | | | | | | | | | | | | 15.0 | |
| First water-dispersible resin | SUPERFLEX 460 | | −21 | | 38% | 10.5 | | | | | 10.5 | 10.5 | 10.5 | 15.8 | 7.9 | 10.5 | 10.5 |
| | SUPERFLEX 500M | | −39 | | 45% | | 8.9 | | | | | | | | | | |
| | Mowinyl 6750 | | 0 | | 49% | | | 8.2 | | | | | | | | | |
| | Mowinyl 966A | | −29 | | 49% | | | | 6.5 | | | | | | | | |
| | NeoCryl BT-62 | | 22 | | 40% | | | | | 8.0 | | | | | | | |
| Second water-dispersible resin | ELITEL KT-9511 | 17000 | | | 30% | 10.7 | 10.7 | 10.7 | 10.7 | 10.7 | | | | 4.0 | 40.0 | 10.7 | 10.7 |
| | ELITEL KT-8803 | 15000 | | | 30% | | | | | | 13.3 | | | | | | |
| | VYLONAL MD-1200 | 15000 | | | 34% | | | | | | | 9.4 | | | | | |
| | ELITEL KA-1449S | 7000 | | | 30% | | | | | | | | 10.7 | | | | |
| Surfactant | OLFINE E1010 | | | | | 0.5 | 0.5 | 0.5 | 0.5 | 0.5 | 0.5 | 0.5 | 0.5 | 0.5 | 0.5 | 0.5 | 0.5 |
| Solvent | Glycerol | | | | | 10.0 | 10.0 | 10.0 | 10.0 | 10.0 | 10.0 | 10.0 | 10.0 | 10.0 | 10.0 | 10.0 | 10.0 |
| Basic substance | Triethanolamine | | | | | | | | | | | | | | | | 0.5 |
| Water | Ion-exchanged water | | | | | 60.4 | 62.0 | 62.8 | 64.4 | 62.9 | 57.7 | 61.7 | 60.4 | 61.8 | 33.7 | 53.3 | 59.9 |
| | Total (% by mass) | | | | | 100.0 | 100.0 | 100.0 | 100.0 | 100.0 | 100.0 | 100.0 | 100.0 | 100.0 | 100.0 | 100.0 | 100.0 |
| | First water-dispersible resin (solid fraction) units: % by mass | | | | | 4.0 | 4.0 | 4.0 | 4.0 | 4.0 | 4.0 | 4.0 | 4.0 | 6.0 | 3.0 | 4.0 | 4.0 |
| | Second water-dispersible resin (solid fraction) units: % by mass | | | | | 3.2 | 3.2 | 3.2 | 3.2 | 3.2 | 3.2 | 3.2 | 3.2 | 1.2 | 12.0 | 3.2 | 3.2 |
| | Total of first water-dispersible resin and second water-dispersible resin units: % by mass | | | | | 7.2 | 7.2 | 7.2 | 7.2 | 7.2 | 7.2 | 7.2 | 7.2 | 7.2 | 15.0 | 7.2 | 7.2 |
| | Second water-dispersible resin/first water-dispersible resin mass ratio | | | | | 0.8 | 0.8 | 0.8 | 0.8 | 0.8 | 0.8 | 0.8 | 0.8 | 0.2 | 4 | 0.8 | 0.8 |

TABLE 3

| | Raw material | Molecular weight | Tg [°C.] | Pigment solid fraction [%] | Resin solid fraction [%] | Ink 12 | Ink 13 | Ink 14 | Ink 15 | Ink 16 | Ink 17 | Ink 18 | Ink 19 | Ink 20 | Ink 21 | Ink 22 |
|---|---|---|---|---|---|---|---|---|---|---|---|---|---|---|---|---|
| Pigment | FUJI SP BLACK 8154 | | | 19% | | 7.9 | 7.9 | 7.9 | 7.9 | 7.9 | 7.9 | 7.9 | 7.9 | 7.9 | 7.9 | 7.9 |
| First water-dispersible resin | SUPERFLEX 460 | | −21 | | 38% | 10.5 | 18.9 | | | | | | 10.5 | 5.3 | 2.6 | 26.3 |
| | SUPERFLEX 500M | | −39 | | 45% | | | 8.9 | | | | | | | | |
| | Mowinyl 6750 | | 0 | | 49% | | | | 8.2 | | | | | | | |
| | Mowinyl 966A | | −29 | | 49% | | | | | 8.2 | | | | | | |
| | NeoCryl BT-62 | | 22 | | 40% | | | | | | 10.0 | | | | | |
| Second water-dispersible resin | ELITEL KT-9511 | 17000 | | | 30% | | | | | | | 13.3 | 0.7 | 40.0 | 1.7 | 30.0 |

TABLE 3-continued

| Raw material | | Molecular weight | Tg [° C.] | Pigment solid fraction [%] | Resin solid fraction [%] | Ink 12 | Ink 13 | Ink 14 | Ink 15 | Ink 16 | Ink 17 | Ink 18 | Ink 19 | Ink 20 | Ink 21 | Ink 22 |
|---|---|---|---|---|---|---|---|---|---|---|---|---|---|---|---|---|
| Surfactant | OLFINE E1010 | | | | | 0.5 | 0.5 | 0.5 | 0.5 | 0.5 | 0.5 | 0.5 | 0.5 | 0.5 | 0.5 | 0.5 |
| Solvent | Glycerol | | | | | 10.0 | 10.0 | 10.0 | 10.0 | 10.0 | 10.0 | 10.0 | 10.0 | 10.0 | 10.0 | 10.0 |
| Water | Ion-exchanged water | | | | | 71.1 | 62.7 | 72.7 | 73.4 | 73.4 | 71.6 | 68.3 | 70.4 | 36.3 | 77.3 | 25.3 |
| Total (% by mass) | | | | | | 100.0 | 100.0 | 100.0 | 100.0 | 100.0 | 100.0 | 100.0 | 100.0 | 100.0 | 100.0 | 100.0 |
| First water-dispersible resin (solid fraction) units: % by mass | | | | | | 4.0 | 7.2 | 4.0 | 4.0 | 4.0 | 4.0 | 0.0 | 4.0 | 2.0 | 1.0 | 10.0 |
| Second water-dispersible resin (solid fraction) units: % by mass | | | | | | 0.0 | 0.0 | 0.0 | 0.0 | 0.0 | 0.0 | 4.0 | 0.2 | 12.0 | 0.5 | 9.0 |
| Total of first water-dispersible resin and second water-dispersible resin units: % by mass | | | | | | 4.0 | 7.2 | 4.0 | 4.0 | 4.0 | 4.0 | 4.0 | 4.2 | 14.0 | 1.5 | 19.0 |
| Second water-dispersible resin/first water-dispersible resin mass ratio | | | | | | | | | | | | | 0.05 | 6 | 0.5 | 0.9 |

The materials shown in Tables 2 and 3 were as follows.

FUJI SP BLACK 8154: an aqueous carbon black dispersion, manufactured by Fuji Pigment Co., Ltd.

CAB-O-JET 250C: an aqueous phthalocyanine dispersion, manufactured by Cabot Corporation SUPERFLEX 460: an aqueous urethane resin emulsion, manufactured by DKS Co. Ltd.

SUPERFLEX 500M: an aqueous urethane resin emulsion, manufactured by DKS Co. Ltd.

Mowinyl 6750: an aqueous acrylic resin emulsion, manufactured by The Nippon Synthetic Chemical Industry Co., Ltd.

Mowinyl 966A: an aqueous styrene/acrylic resin emulsion, manufactured by The Nippon Synthetic Chemical Industry Co., Ltd.

NeoCryl BT-62: an aqueous styrene/acrylic resin emulsion, manufactured by DSM Coating Resins D.V.

ELITEL KT-9511: an aqueous polyester resin emulsion, manufactured by Unitika Ltd.

ELITEL KT-8803: an aqueous polyester resin emulsion, manufactured by Unitika Ltd.

VYLONAL MD-1200: an aqueous polyester resin emulsion, manufactured by Toyobo Co., Ltd., ELITEL KA-1449S: an aqueous polyester resin emulsion, manufactured by Unitika Ltd.

OLFINE E1010: an acetylene glycol-based surfactant (a nonionic surfactant), manufactured by Nissin Chemical Industry Co., Ltd.

Glycerol: manufactured by Wako Pure Chemical Industries, Ltd.

Triethanolamine: manufactured by Wako Pure Chemical Industries, Ltd.

Examples 1 to 13 and Comparative Examples 1 to 11

Production of Printed Textile Items

Using the prepared inks and pretreatment agents, printed textile items of Examples 1 to 13 and Comparative Examples 1 to 11 were prepared.

Specifically, in Examples 1 to 12, Comparative Examples 1 to 9 and Comparative Example 11, a step 1 and a step 2 described below were performed in that order to produce a printed textile item. In Example 13 and Comparative Example 10, a printed textile item was produced by performing the step 2 described below without first performing the step 1.

Step 1

The pretreatment agent shown in Table 4 or 5 was applied to the test piece using an air brush using a coating amount of 70% relative to the mass of the test piece (fabric). Following application of the pretreatment agent, the test piece was heated at 180° C. for 60 seconds using a Hotronix Fusion heat press (manufactured by Stahls Hotronix, Inc.).

Step 2

The ink shown in Table 4 or 5 was loaded into an inkjet printer MMP813BT-3 manufactured by Mastermind Inc., and printed onto the test piece (in those examples in which the step 1 is performed, the test piece that had been subjected to the step 1). The printed image was a monochromatic solid image, and the amount of ink applied was set to about 20 g/m². Following printing, the test piece was heated at 150° C. for 60 seconds using the Hotronix Fusion heat press.

The color development, dry rubbing fastness and wet rubbing fastness of the produced printed textile item were evaluated using the methods described below. The results are shown in Tables 4 and 5.

Color Development

The OD value of the printed item was measured using an X-Rite eXact device (manufactured by X-Rite Inc).

A: OD value of 1.2 or greater
B: OD value of at least 1.1 but less than 1.2
C: OD value of at least 1.0 but less than 1.1
D: OD value of less than 1.0

Dry Rubbing Fastness

Using a Gakushin-type rubbing tester RT-200 (manufactured by Daiei Kagaku Seiki Mfg. Co., Ltd.), 100 back and forth rubbing repetitions were performed with no additional weight. The fabric used for the rubbing was a 100% cotton Kanakin No. 3 cloth.

The level of staining was evaluated by grayscale, and the discoloration was evaluated from the reduction in the OD value. Measurement of the OD value was performed using an X-Rite eXact device (manufactured by X-Rite Inc).

The evaluation criteria for the "staining" were as follows.

A: grade 4 or higher
B: grade 3 to grade 3-4
C: grade 2 to grade 2-3
D: grade 1-2 or lower The evaluation criteria for the "discoloration" were as follows.

A: reduction in OD value due to rubbing of less than 3%
B: reduction in OD value due to rubbing of at least 3% but less than 5%
C: reduction in OD value due to rubbing of at least 5% but less than 10%
D: reduction in OD value due to rubbing of 10% or greater Wet Rubbing Fastness Using a Gakushin-type rubbing tester RT-200 (manufactured by Daiei Kagaku Seiki Mfg. Co., Ltd.), 100 back and forth rubbing repetitions were performed with no additional weight. The fabric used for the rubbing was a 100% cotton Kanakin No. 3 cloth that had been wet with an amount of ion-exchanged water of the same weight as the fabric.

The "staining" was evaluated by grayscale, and the "discoloration" was evaluated from the reduction in the OD value. Measurement of the OD value was performed using an X-Rite eXact device (manufactured by X-Rite Inc).

The evaluation criteria for the "staining" were as follows.
A: grade 4 or higher
B: grade 3 to grade 3-4
C: grade 2 to grade 2-3
D: grade 1-2 or lower The evaluation criteria for the "discoloration" were as follows.
A: reduction in OD value due to rubbing of less than 3%
B: reduction in OD value due to rubbing of at least 3% but less than 5%
C: reduction in OD value due to rubbing of at least 5% but less than 10%
D: reduction in OD value due to rubbing of 10% or greater

TABLE 4

| Table 4 | | Example 1 Pretreatment agent A Ink 1 | Example 2 Pretreatment agent A Ink 2 | Example 3 Pretreatment agent A Ink 3 | Example 4 Pretreatment agent A Ink 4 | Example 5 Pretreatment agent A Ink 5 | Example 6 Pretreatment agent A Ink 6 | Example 7 Pretreatment agent A Ink 7 |
|---|---|---|---|---|---|---|---|---|
| | Color development (OD value) | A | A | A | A | A | A | A |
| Wet rubbing fastness | Staining | A | A | A | A | B | A | A |
| | Discoloration (reduction in OD value due to rubbing) | A | A | A | A | B | A | A |
| Dry rubbing fastness | Staining | A | A | A | A | B | A | A |
| | Discoloration (reduction in OD value due to rubbing) | A | A | A | A | B | A | A |

| Table 4 continued | | Example 8 Pretreatment agent A Ink 8 | Example 9 Pretreatment agent A Ink 9 | Example 10 Pretreatment agent A Ink 10 | Example 11 Pretreatment agent A Ink 11 | Example 12 Pretreatment agent B Ink 11 | Example 13 none Ink 1 |
|---|---|---|---|---|---|---|---|
| | Color development (OD value) | A | A | A | A | A | C |
| Wet rubbing fastness | Staining | B | A | A | A | A | A |
| | Discoloration (reduction in OD value due to rubbing) | B | A | A | A | A | A |
| Dry rubbing fastness | Staining | B | A | A | A | A | A |
| | Discoloration (reduction in OD value due to rubbing) | B | A | A | A | A | A |

TABLE 5

| Table 5 | | Comparative Example 1 Pretreatment agent A Ink 12 | Comparative Example 2 Pretreatment agent A Ink 13 | Comparative Example 3 Pretreatment agent A Ink 14 | Comparative Example 4 Pretreatment agent A Ink 15 | Comparative Example 5 Pretreatment agent A Ink 16 | Comparative Example 6 Pretreatment agent A Ink 17 |
|---|---|---|---|---|---|---|---|
| | Color development (OD value) | A | A | A | A | A | A |
| Wet rubbing fastness | Staining | C | B | C | C | C | D |
| | Discoloration (reduction in OD value due to rubbing) | D | D | D | D | D | D |
| Dry rubbing fastness | Staining | C | B | C | C | C | D |
| | Discoloration (reduction in OD value due to rubbing) | D | D | D | D | D | D |

| Table 5 continued | | Comparative Example 7 Pretreatment agent A Ink 18 | Comparative Example 8 Pretreatment agent A Ink 19 | Comparative Example 9 Pretreatment agent A Ink 20 | Comparative Example 10 none Ink 21 | Comparative Example 11 Pretreatment agent A Ink 22 |
|---|---|---|---|---|---|---|
| | Color development (OD value) | A | A | A | C | (undischargeable) |
| Wet rubbing fastness | Staining | D | C | D | D | (undischargeable) |
| | Discoloration (reduction in OD value due to rubbing) | D | D | D | D | (undischargeable) |
| Dry rubbing fastness | Staining | D | C | D | D | (undischargeable) |
| | Discoloration (reduction in OD value due to rubbing) | D | D | D | D | (undischargeable) |

Example 14

The prepared ink 23 was sealed in a glass bottle and left to stand in an environment at 70° C. for one month. After standing, coarse particles were removed using a 0.8 μm cellulose acetate membrane filter, yielding a post-standing ink 23.

The ink 23 obtained immediately following preparation and before standing in an environment at 70° C. for one month (the initial ink 23) and the post-standing ink 23 were each used, together with the aforementioned test piece and the pretreatment agent A, to produce a printed textile item by performing the step 1 and the step 2 described above.

The printed textile item obtained in this manner using the initial ink 23 and the printed textile item obtained using the post-standing ink 23 were each evaluated for color development, dry rubbing fastness staining and wet rubbing fastness staining using the evaluation methods and evaluation criteria described above.

The results are shown in Table 6.

TABLE 6

| Table 6 | | Example 14 before standing Pretreatment agent A Initial ink 23 | Example 14 after standing Pretreatment agent A Post-standing ink 23 |
|---|---|---|---|
| Color development (OD value) | | A | A |
| Wet rubbing fastness | Staining | A | A |
| Dry rubbing fastness | Staining | A | A |

As shown in Table 4, in Examples 1 to 13, printed textile items having excellent rubbing fastness were able to be produced.

In contrast, as shown in Table 5, in Comparative Examples 1 to 6 which used the inks 12 to 17 respectively containing no second water-dispersible resin, Comparative example 7 which used the ink 18 containing no first water-dispersible resin, Comparative Example 8 which used the ink 19 in which the ratio of the second water-dispersible resin relative to the first water-dispersible resin was ink of 0.05, Comparative Example 9 which used the ink 20 in which the ratio of the second water-dispersible resin relative to the first water-dispersible resin in the ink was 6, and Comparative Example 10 which used the ink 21 in which the total amount (combined mass) of the first water-dispersible resin and the second water-dispersible resin in the ink was 1.5% by mass, satisfactory rubbing fastness could not be obtained. Further, in Comparative Example 11 which used the ink 22 in which the total amount (combined mass) of the first water-dispersible resin and the second water-dispersible resin in the ink was 19% by mass, satisfactory discharge performance could not be achieved.

Furthermore, as shown in Table 6, in Example 14 which used the ink 23 containing a basic substance, a printed textile item having excellent color development and rubbing fastness was able to be obtained even after the ink had been left to stand.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous pigment ink for textile inkjet printing comprising a pigment, a first water-dispersible resin, a second water-dispersible resin, and water, wherein
the first water-dispersible resin is at least one resin selected from the group consisting of a water-dispersible urethane resin, a water-dispersible (meth)acrylic resin and a water-dispersible styrene/(meth)acrylic resin,
the first water-dispersible resin comprises the water-dispersible urethane resin,
the second water-dispersible resin is a water-dispersible polyester resin,
a glass transition temperature of the second water dispersible resin is 5° C. or higher,
a total amount of the first water-dispersible resin and the second water-dispersible resin is from 2 to 18% by mass relative to a total mass of the ink, and
a mass ratio of the second water-dispersible resin relative to the first water-dispersible resin (second water-dispersible resin/first water-dispersible resin) is from 0.1 to 5.0.

2. The aqueous pigment ink for textile inkjet printing according to claim 1, wherein a glass transition temperature of the first water-dispersible resin is 10° C. or lower.

3. The aqueous pigment ink for textile inkjet printing according to claim 1, wherein a number average molecular weight of the second water-dispersible resin is at least 10,000.

4. The aqueous pigment ink for textile inkjet printing according to claim 1, wherein the first water-dispersible resin comprises an anionic water-dispersible urethane resin.

5. The aqueous pigment ink for textile inkjet printing according to claim 1, wherein the second water-dispersible resin comprises an anionic water-dispersible resin.

6. The aqueous pigment ink for textile inkjet printing according to claim 1, further comprising a basic substance.

7. The aqueous pigment ink for textile inkjet printing according to claim 6, wherein the basic substance comprises at least one selected from the group consisting of sodium hydroxide and an ethanolamine.

8. The aqueous pigment ink for textile inkjet printing according to claim 6, wherein an amount of the basic substance, relative to the total mass of the ink, is from 0.01% by mass to 5.0% by mass.

9. A method for producing a printed textile item, the method comprising performing inkjet printing to a fabric using the aqueous pigment ink for textile inkjet printing according to claim 1.

10. The method for producing a printed textile item according to claim 9, wherein the fabric is a fabric containing polyester fibers.

11. The method for producing a printed textile item according to claim 10, wherein the fabric is a fabric containing at least 30% by mass of polyester fibers.

12. A method for producing a printed textile item, comprising performing inkjet printing to a fabric using an aqueous pigment ink for textile inkjet printing,
wherein the aqueous pigment ink comprises a pigment, a first water-dispersible resin, a second water-dispersible resin, and water,
the first water-dispersible resin is at least one resin selected from the group consisting of a water-dispersible urethane resin, a water-dispersible (meth)acrylic resin and a water-dispersible styrene/(meth)acrylic resin, the second water-dispersible resin is a water-dispersible polyester resin, a total amount of the first water-dispersible resin and the second water-dispersible resin is from 2 to 18% by mass relative to a total mass of the ink, and a mass ratio of the second water-dispersible resin relative to the first water-dispersible resin (second water-dispersible resin/first water-dispersible resin) is from 0.1 to 5.0, and prior to performing inkjet printing, applying a pretreatment agent comprising a cationic substance.

13. The method for producing a printed textile item according to claim 12, wherein the cationic substance comprises a cationic polymer.

14. The method for producing a printed textile item according to claim 13, wherein the cationic polymer comprises at least one selected from the group consisting of a polyallylamine and a salt thereof.

15. An ink set comprising an aqueous pigment ink for textile inkjet printing including a pigment, a first water-dispersible resin, a second water-dispersible resin, and water, wherein the first water-dispersible resin is at least one resin selected from the group consisting of a water-dispersible urethane resin, a water-dispersible (meth)acrylic resin and a water-dispersible styrene/(meth)acrylic resin, the second water-dispersible resin is a water-dispersible polyester resin, a total amount of the first water-dispersible resin and the second water-dispersible resin is from 2 to 18% by mass relative to a total mass of the ink, and a mass ratio of the second water-dispersible resin relative to the first water-dispersible resin (second water-dispersible resin/first water-dispersible resin) is from 0.1 to 5.0, and a pretreatment agent comprising a cationic substance.

16. The ink set according to claim 15, wherein the cationic substance comprises a cationic polymer.

17. The ink set according to claim 16, wherein the cationic polymer comprises at least one selected from the group consisting of a polyallylamine and a salt thereof.

18. The ink set according to claim 15, wherein the aqueous pigment ink for textile inkjet printing further comprises a basic substance, and the first water-dispersible resin comprises the water-dispersible urethane resin.

* * * * *